United States Patent
Blaner et al.

(10) Patent No.: US 6,857,065 B2
(45) Date of Patent: Feb. 15, 2005

(54) SYSTEM AND METHOD FOR SYSTEM INITIALIZATING A DATA PROCESSING SYSTEM BY SELECTING PARAMETERS FROM ONE OF A USER-DEFINED INPUT, A SERIAL NON-VOLATILE MEMORY AND A PARALLEL NON-VOLATILE MEMORY

(75) Inventors: Bartholomew Blaner, Underhill Center, VT (US); Arnold Steven Tran, S. Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 09/898,812

(22) Filed: Jul. 5, 2001

(65) Prior Publication Data

US 2003/0009655 A1 Jan. 9, 2003

(51) Int. Cl.[7] .......................................... G06F 15/177
(52) U.S. Cl. ............................................. 713/1
(58) Field of Search ................................. 713/1

(56) References Cited

U.S. PATENT DOCUMENTS

| 5,555,423 | A |   | 9/1996  | Grochowski et al. |
| 5,574,883 | A |   | 11/1996 | Freeman |
| 5,574,926 | A |   | 11/1996 | Miyazawa et al. |
| 5,592,652 | A |   | 1/1997  | Hongo et al. |
| 5,802,287 | A |   | 9/1998  | Rostoker et al. |
| 5,918,061 | A |   | 6/1999  | Nikjou |
| 5,929,672 | A |   | 7/1999  | Mitani |
| 5,987,605 | A | * | 11/1999 | Hill et al. ....................... 713/2 |
| 5,999,447 | A | * | 12/1999 | Naura et al. ........... 365/185.04 |
| 6,092,229 | A |   | 7/2000  | Boyle et al. |
| 6,438,687 | B2| * | 8/2002  | Klein ............................. 713/1 |
| 6,718,464 | B2| * | 4/2004  | Cromer et al. ................ 713/2 |

\* cited by examiner

Primary Examiner—Lynne H. Browne
Assistant Examiner—Eric Chang
(74) Attorney, Agent, or Firm—Richard A. Henkler; Dillon & Yudell LLP

(57) ABSTRACT

A system and method for selecting a system for initializing a data processing system. A data processing system includes, a processor coupled to a memory via an interconnect and multiple systems for initializing the aforementioned data processing system. A multiplexor is also included to select between multiple initialization systems. In the method of initializing a data processing system, an initialization or reset command is received from an external reset circuit or the processor; at least one selector signal is generated; and a set of initialization data from a selected initialization system is utilized to initialize the data processing system.

11 Claims, 3 Drawing Sheets

US 6,857,065 B2

SYSTEM AND METHOD FOR SYSTEM INITIALIZATING A DATA PROCESSING SYSTEM BY SELECTING PARAMETERS FROM ONE OF A USER-DEFINED INPUT, A SERIAL NON-VOLATILE MEMORY AND A PARALLEL NON-VOLATILE MEMORY

BACKGROUND OF THE INVENTION

1. Technical Field

The present invention relates in general to the field of data processing systems, and in particular, to a system and method for initializing data processing systems.

2. Description of the Related Art

It is well-known in the art that computer systems must be initialized before any other functions can be performed. Traditionally, the necessary initialization data (e.g., operating parameters) are stored in a non-volatile memory location, such as a read-only memory (ROM). At startup, the initialization data are transferred to the processor from the ROM in order to initialize the computer system.

ROM is generally inexpensive and supports fast access times, but its contents cannot be modified. Thus, when inadequacies are found in the initialization data or it is desired to change a set of initialization data implemented in the ROM, the ROM must be removed and replaced. As a consequence, in most cases, data processing systems can only be initialized utilizing a single set of initialization data.

It is sometimes the case that a user may desire to initialize a data processing system utilizing different initialization data, depending on the application of the data processing system. However, if a traditional ROM is utilized to store the initialization data, the data processing system can only be initialized in one way. Thus, the user does have the desired flexibility to initialize the data processing system to a configuration specifically adapted for a particular application.

SUMMARY OF THE INVENTION

To overcome the foregoing and additional limitations in the prior art, the present invention provides a data processing system having three initialization systems. The data processing system includes an apparatus for selecting which initialization system is utilized by the data processing system. This apparatus may include a multiplexor, a set of control resistors, a user-defined control input, multiple parameter registers, and a command decoder. The data processing system is initialized by one of the initialization systems coupled to an initialization input.

In a preferred embodiment, the first system for initializing a data processing system utilizes an initialization input coupled to the set of initialization resistors. The initialization input specifies a first set of initialization data. The second system for initializing a data processing system includes a serial non-volatile memory storing a second set of initialization data that is serially transmitted to the parameter registers. The third system for initializing a data processing system includes a parallel non-volatile memory storing a third set of initialization data that is transmitted in parallel to the parameter registers.

In a method of initializing a data processing system according to the present invention, a control signal is output by the set of initialization resistors, in response to a user-defined control input. Depending on a value of the control signal, the multiplexor designates a selected initialization system among a plurality of initialization systems. The selected initialization system relays a set of initialization data to the parameter registers.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
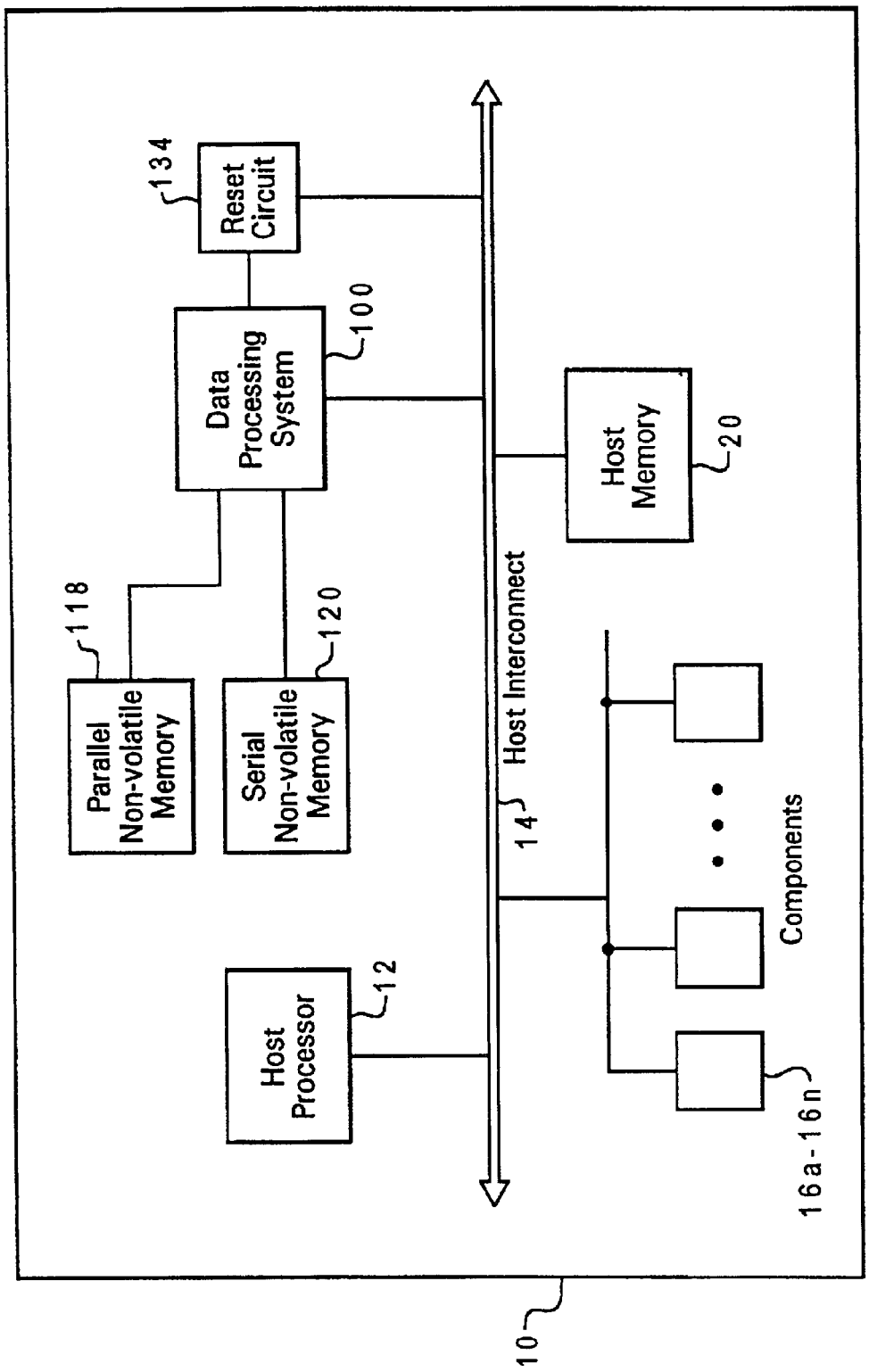
FIG. 1 depicts a detailed block diagram of an exemplary host data processing system that may be utilized to implement a preferred embodiment of the present invention.

With reference now to the figures, and in particular with reference to FIG. 1, there is depicted an exemplary host data processing system 10 in accordance with the present invention. Host data processing system 10 includes a host processor 12 and a host memory 20 coupled to a host interconnect 14, which may be implemented as a bus, a switch, or any other type of coupling apparatus. Multiple additional components 16a–16n may be coupled to host interconnect 14. Components 16a–16n can be any type of peripheral device, such as a hard disk drive or a compact disk read-only memory (CD-ROM) drive. Host data processing system 10 further includes a data processing system 100 coupled to host interconnect 14, parallel non-volatile memory 118, serial non-volatile memory 120, and a reset circuit 134 that can be utilized to restart data processing system 100.

Figure 2:
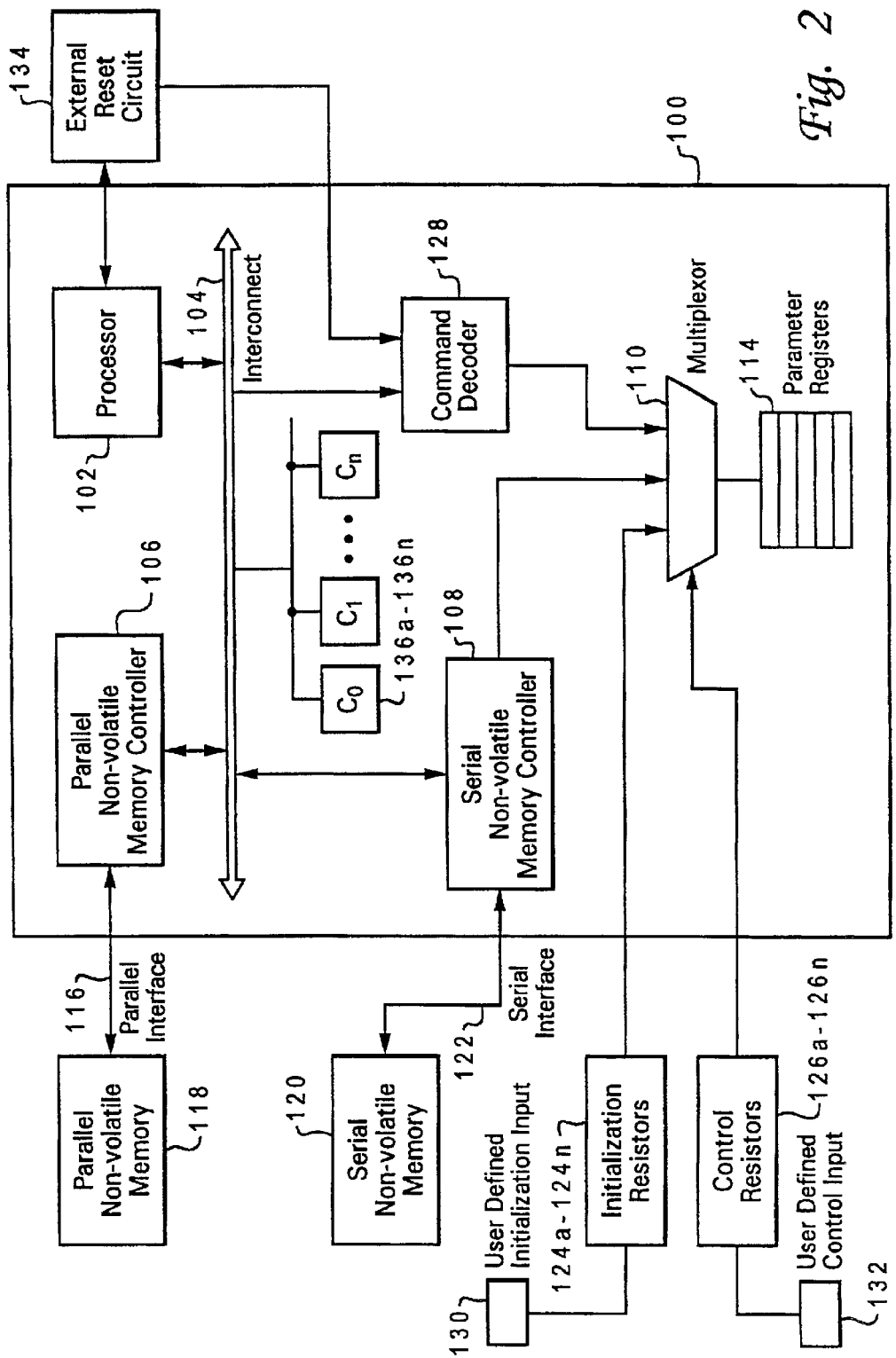
FIG. 2 illustrates a detail block diagram of an exemplary data processing system that may be utilized to implement a preferred embodiment of the present invention.

Referring to FIG. 2, there is illustrated a more detailed block diagram of an embodiment of data processing system 100 in accordance with the present invention. In the depicted embodiment, data processing system 100 is implemented as a system-on-a-chip (SOC). An SOC typically includes several complex circuit blocks, or modules, within the bounds of a single integrated circuit substrate. The basic concept behind SOC design involves placing logic cores or memory macros in an integrated circuit substrate much the same way off-the-shelf components are placed on printed circuit boards, then adding memory, logic, and data path or interconnect coupling in order to implement system level integration. SOCs address the need for higher chip densities and permit data processing system functionality such as audio, video, and graphics, which have typically been coupled to a processor at the card level, to be integrated into a single integrated circuit substrate.

Data processing system 100 includes a processor 102 coupled to interconnect 104, which may be implemented as a bus, a switch, or any other type of coupling apparatus. In addition, data processing system 100 may include a plurality of other components, illustrated generally at reference numeral 136a–136n. An external reset circuit 134, coupled to processor 102, is utilized to reset data processing system 100. Following reset, multiple parameter registers 114 must be loaded with proper initialization data required to operate data processing system 100.

"Initialization" is defined herein as the startup of a data processing system and its required components. For example, a component in data processing system 100 that requires initialization is a central clock generation block. The central clock generation block produces clock pulses for various components of the data processing system by multiplying a reference clock input in frequency utilizing a phase-locked loop, and further dividing the phase-locked loop output clock signal by various values to produce the correct clock pulses. The values for the multiplier and dividers are required before the data processing system 100 can operate at functional clock frequencies and are considered part of the necessary initialization data. In accordance with a preferred embodiment of the present invention, data processing system 100 includes three initialization systems for initializing data processing system 100 by loading parameter register 114 with user-specified initialization data.

The first system for initializing a data processing system includes an initialization input 130, implemented as multiple input/output pads located at the perimeter of data processing system 100 and coupled to a set of initialization resistors 124a–124n. Initialization resistors 124a–124n output an initialization signal in response to a signal applied by an external source, such as a coupling to a ground or power rail, to initialization input 130. This initialization signal represents a first set of initialization data that can be utilized to initialize data processing system 100, and is coupled to a first input of multiplexor 110.

The second system for initializing a data processing system includes a serial non-volatile memory 120 coupled to a serial non-volatile memory controller 108 via serial interface 122. Stored in serial non-volatile memory 120 is a second set of initialization data which can be utilized to initialize data processing system 100. Serial non-volatile memory controller 108 is further coupled to a second input of multiplexor 110. When the second input of multiplexor 110 is selected, serial non-volatile memory controller 108 regulates the transfers of the second set of initialization data through multiplexor 110.

The third system for initializing a data processing system includes a parallel non-volatile memory 118 coupled to parallel non-volatile memory controller 106 via parallel interface 116. Parallel non-volatile memory 118 stores a third set of initialization data which can be utilized to initialize data processing system 100. A command decoder 128 is coupled to both parallel non-volatile memory controller 106 and processor 102. Command decoder 128 filters instructions issued from processor 102 for a specific set of instructions that cause the third set of initialization data to be directed to multiplexor 110.

Multiplexor 110 is coupled to initialization resistors 124a–124n, serial non-volatile memory controller 108, and command decoder 128. Multiplexor 110 selects a set of initialization data to be relayed to multiple parameter registers 114, in response to a control signal output from a set of control resistors 126a–126n. The control signal is generated in response to a user-defined control input 132, applied by an external source, such as a coupling to a ground or power rail, which specifies which one of the above described data processing system initialization systems is to be utilized to initialize data processing system 100. User-defined control input 132 is implemented as multiple input/output pads located at the perimeter of data processing system 100.

Figure 3:
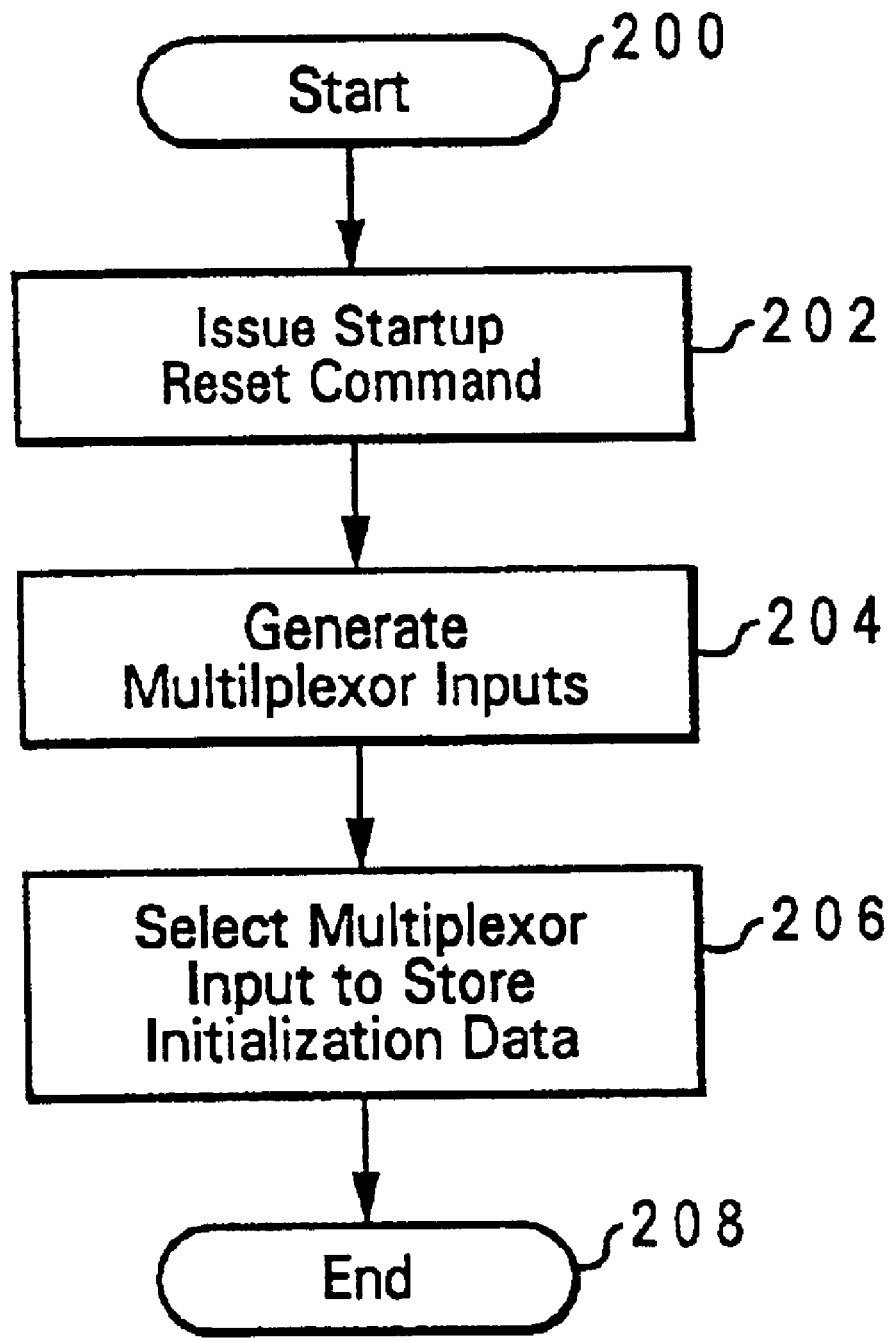
FIG. 3 is a high-level logic flowchart depicting a method of initializing the data processing system illustrated in FIG. 2 in accordance with a preferred embodiment of the present invention.

Now referring to FIG. 3, a high-level logic flowchart illustrating a method of selecting a system for initializing a data processing system in accordance with the present invention is depicted. A preferred embodiment of the present invention can implement the method of selecting a system for initializing a data processing system utilizing processor 102, control resistors 126a–126n, user-defined control input 132, and multiplexor 110.

As illustrated, the process begins at block 200 and then continues to block 202, which illustrates external reset circuit 134 issuing a start-up or reset command to processor 102 that restarts data processing system 100. Next, as depicted at block 204, a control signal is relayed to multiplexor 110 by control resistors 126a–126n in response to a signal applied by the user to user-defined control input 132.

The process then continues to block 206, which illustrates multiplexor 110, in response to the control signal, selecting from among its inputs a set of initialization data to store in parameter registers 114. If a user specifies a first option at user-defined control input 132, the first set of initialization data output from initialization resistors 124a–124n is selected and relayed through multiplexor 110 to parameter registers 114. If the user specifies a second option at user-defined control input 132, the second set of initialization data is serially transmitted from serial non-volatile memory 120 and relayed through multiplexor 110 to parameter registers 114 by serial non-volatile memory controller 108. Finally, if the user specifies a third option at user-defined control input 132, a default set of initialization data is written to parameter registers 114 by external reset circuit 134 through command decoder 128. This default set of initialization data enables processor 102 and parallel non-volatile memory controller 106 to perform at a minimal level of operation.

"Minimal level of operation" is herein defined as a level of operation sufficient to complete an initialization process of a data processing system. For example, a data processing system includes a processor designed to perform complex computations is rated at 200 MHz. To reach the 200 MHz performance level, a set of parameter registers of the data processing system must be set to particular values specified in the aforementioned set of initialization data. However, in most processors, if parameter registers are set to default values, the processor might run at 1 MHz. At that level of performance, the processor would be inadequate for calculating complex computations, but is sufficient for relaying a set of initialization data from a parallel non-volatile memory to the parameter registers for complete initialization of data processing system.

Processor 102, while performing at a minimal level of operation, retrieves the third set of initialization data from parallel non-volatile memory 118 and sends an instruction instructing command decoder 128 to relay the third set of initialization data to parameter registers 114 through command decoder 128 and multiplexor 110.

As described above, an improved system and method for initializing a data processing system is presented. An exemplary data processing system, as implemented according to a preferred embodiment of the present invention, includes three systems for initializing the data processing system and a multiplexor for selecting between the three systems. A user-defined control input receives a signal from a user that designates which one of the three initialization systems is utilized in the initialization of the data processing system. A set of control resistors outputs a control signal to the multiplexor, which determines the selected initialization system utilized, in response to the signal from the user.

While the invention has been particularly shown and described with reference to a preferred embodiment, it will be understood by those skilled in the art that various changes in form and detail may be made therein without departing from the spirit and scope of the invention.

What is claimed is:

1. A system for initializing a data processing system, comprising:
    a plurality of parameter registers;
    a hardware initialization port capable of receiving a first set of user-definable initialization data utilized for initializing said data processing system;
    a serial non-volatile memory, coupled to said plurality of parameter registers, said serial non-volatile memory utilized for storing a second set of initialization data utilized for initializing said data processing system;
    a parallel non-volatile memory, coupled to said plurality of parameter registers, said parallel non-volatile memory utilized for storing a third set of initialization data utilized for initializing said data processing system; and
    a multiplexor interposed between said parameter registers and said hardware initialization port, said serial non-volatile memory, and said parallel non-volatile memory, wherein said multiplexer determines a selected set of initialization data from among said first, second and third sets of initialization data and relays said selected set of initialization data to said plurality of parameter registers, in response to a control signal, such that said data processing system is initialized from an uninitialized state to a minimal level of operation utilizing said selected set of initialization data.

2. The system for initializing a data processing system according to claim 1, further including a set of control resistors coupled to a user-defined control input signal, wherein said set of control resistors outputs said control signal in response to said user-defined control input signal.

3. The system for initializing a data processing system according to claim 1, further including a set of initialization resistors coupled to the hardware initialization port to provide said first set of user-definable initialization data, wherein said set of initialization resistors outputs said first set of user-definable initialization data to said hardware initialization port in response to an initialization input signal.

4. The system for initializing a data processing system according to claim 1, further including:
    a processor; and
    a command decoder is interposed between said multiplexor and said processor and said parallel non-volatile memory, wherein said command decoder filters commands issued from said processor for a set of desired commands.

5. The system for initializing a data processing system according to claim 1, further including a serial non-volatile memory controller interposed between said serial non-volatile memory and said multiplexor, wherein said serial non-volatile memory controller controls data output by said serial non-volatile memory.

6. The system for initializing a data processing system according to claim 4, further including a parallel non-volatile memory controller interposed between said parallel non-volatile memory and said command decoder, wherein said parallel non-volatile memory controller controls data output by said parallel non-volatile memory.

7. A data processing system, comprising:
    a processor;
    a memory, coupled to said processor; and
    a system for initializing the data processing system, including:
        a plurality of parameter registers;
        a hardware initialization port capable of receiving a first set of user-definable initialization data utilized for initializing said data processing system;
        a serial non-volatile memory, coupled to said plurality of parameter registers, said serial non-volatile memory utilized for storing a second set of initialization data utilized for initializing said data processing system;
        a parallel non-volatile memory, coupled to said plurality of parameter registers, said parallel non-volatile memory utilized for storing a third set of initialization data utilized for initializing said data processing system; and
        a multiplexor interposed between said parameter registers and said hardware initialization port, said serial non-volatile memory, and said parallel non-volatile memory, wherein said multiplexor selects a selected set of initialization data from among said first, second and third sets of initialization data, and relays said selected set of initialization data to said plurality of parameter registers, in response to a control signal;
    wherein said data processing system initializes from an uninitialized state to a minimal level of operation utilizing said selected set of initialization data.

8. A host data processing system, comprising:
    an integrated circuit in which a data processing system in accordance with claim 7 is fabricated;
    an interconnect coupled to said integrated circuit;
    a host processor; and
    a host memory.

9. A method of initializing a data processing system, said method comprising:
    sending a control signal to a multiplexor, said control signal designating one of a plurality of sets of initialization data as a preferred set of initialization data for initializing said data processing system, said plurality of sets of initialization data including:
        a first set of user-definable initialization data accessible at a hardware initialization port of the data processing system;
        a second set of initialization data accessible in a serial non-volatile memory; and
        a third set of initialization data accessible in a parallel non-volatile memory;
    in response to the control signal, the multiplexor relaying said preferred set of initialization data to a plurality of parameter registers; and
    utilizing said preferred sot of initialization data stored in said plurality of parameter registers to initialize said data processing system from an uninitialized state to a minimal level of operation.

10. The method of initializing a data processing system according to claim 9, wherein sending a control signal to a multiplexor comprises sending said control signal in response to receipt of a signal at a hardware control input port.

11. The method of initializing a data processing system according to claim 9, further including:
    a command decoder filtering commands issued from a processor, in response to designating said third set of initialization data as said preferred set of initialization data.

* * * * *

UNITED STATES PATENT AND TRADEMARK OFFICE
CERTIFICATE OF CORRECTION

PATENT NO.   : 6,857,065 B2
DATED        : February 15, 2005
INVENTOR(S)  : Blaner et al.

It is certified that error appears in the above-identified patent and that said Letters Patent is hereby corrected as shown below:

Title page, Item [54] and Column 1, line 1,
Title, please delete the entire title and insert therefore the following:
-- SYSTEM AND METHOD FOR INITIALIZING A DATA PROCESSING SYSTEM BY SELECTING PARAMETERS FROM ONE OF A USER-DEFINED INPUT, A SERIAL NON-VOLATILE MEMORY AND A PARALLEL NON-VOLATILE MEMORY --

Column 6,
Lines 50-55, please delete and insert the following:
-- Utilizing said preferred set of initialization data stored in said plurality of parameter registers to initalize said data processing system from an uninitialized state to a minimal level of operation. --

Signed and Sealed this

Thirty-first Day of May, 2005

JON W. DUDAS
*Director of the United States Patent and Trademark Office*